Patented Oct. 21, 1930

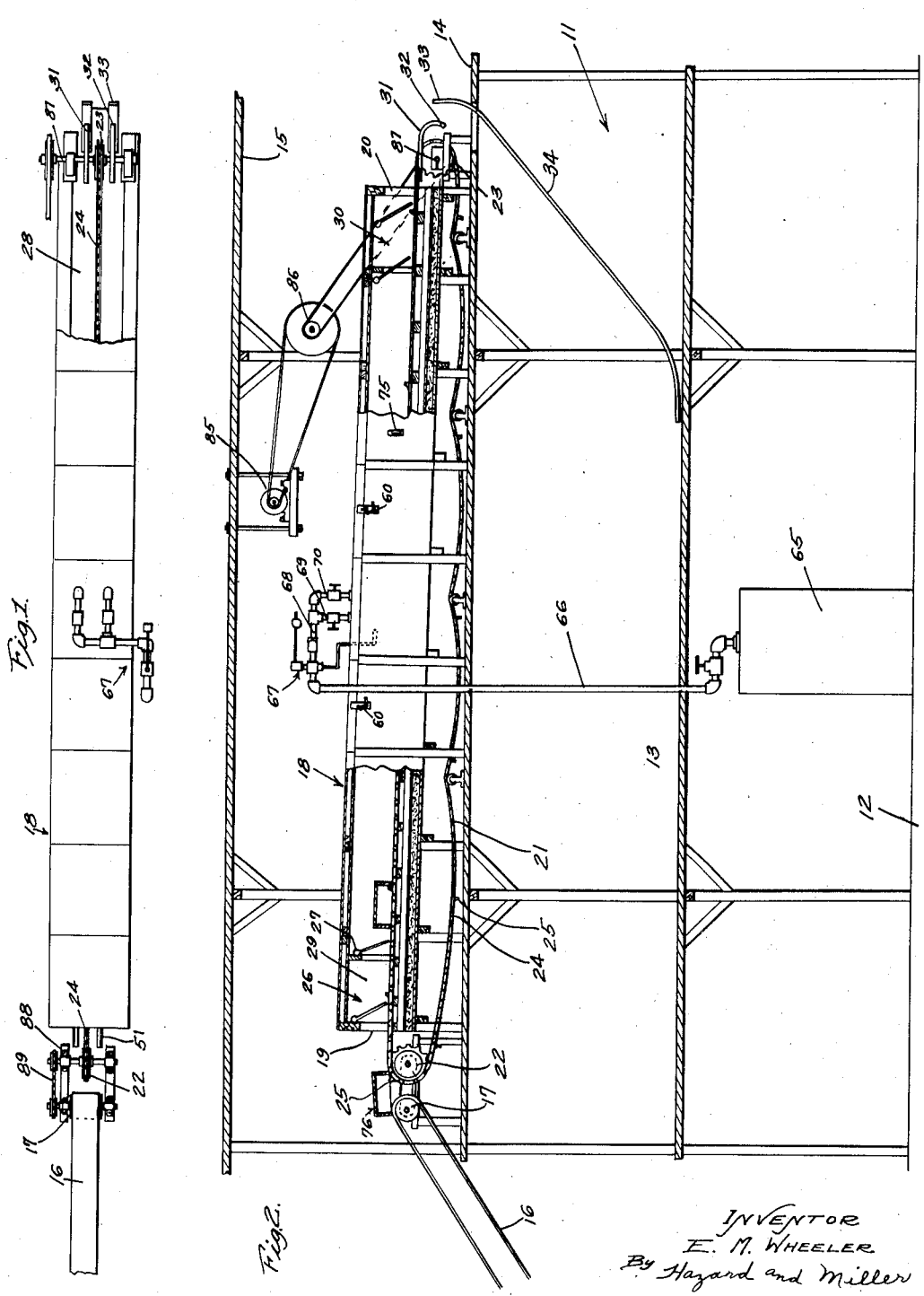

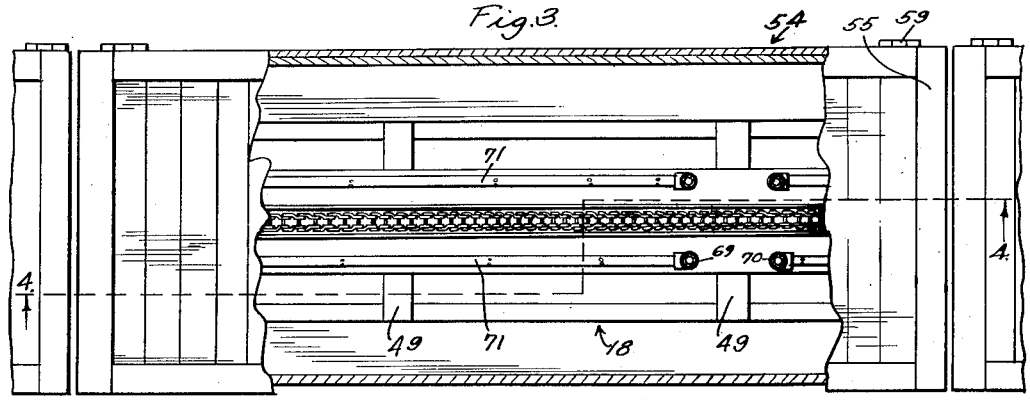
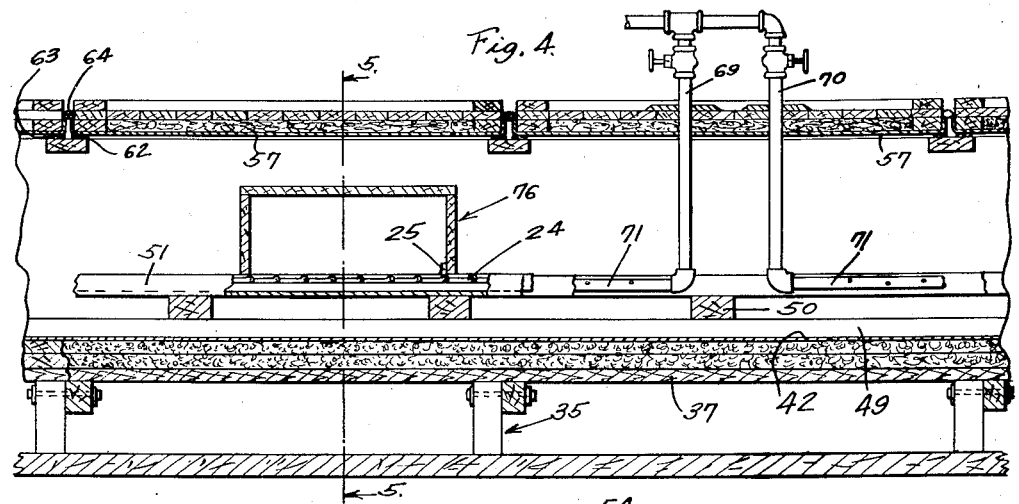
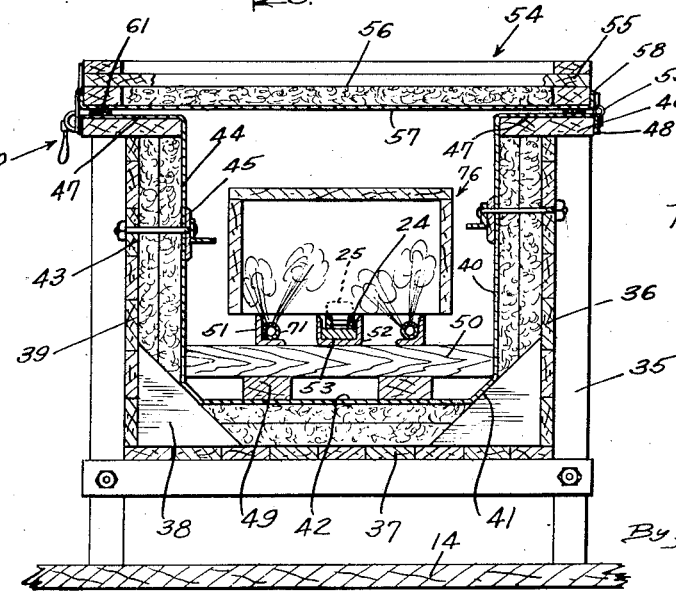

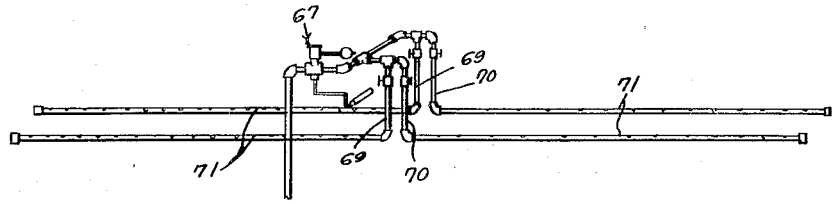
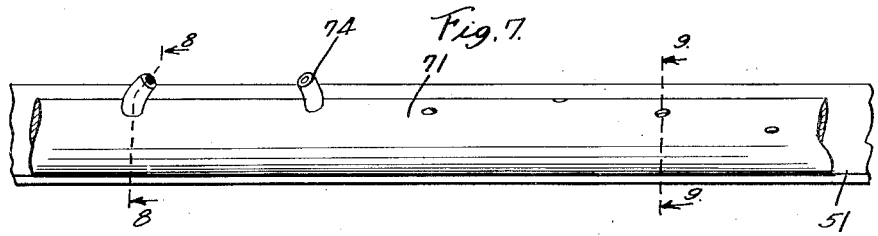
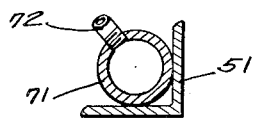 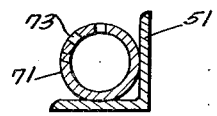
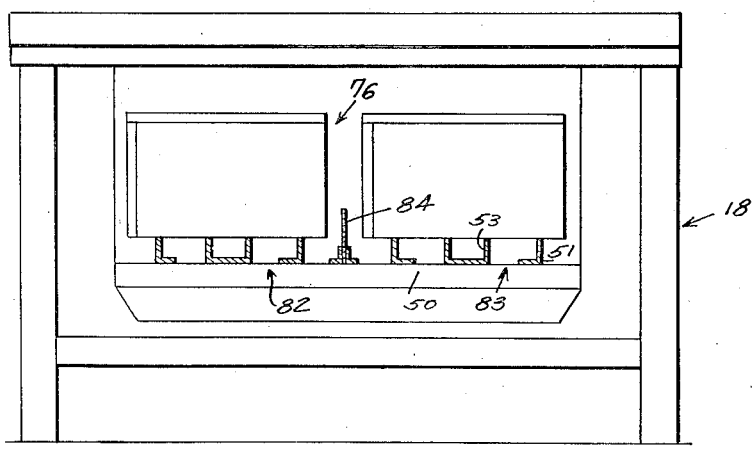
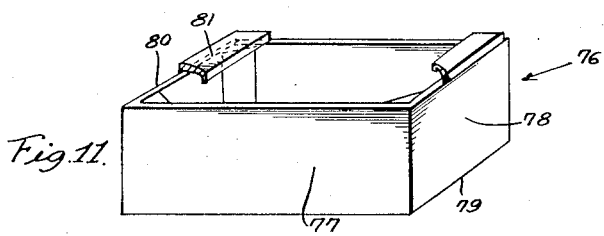

1,779,152

UNITED STATES PATENT OFFICE

EDWARD M. WHEELER, OF SAN DIMAS, CALIFORNIA

FRUIT-BOX STERILIZER

Application filed June 8, 1927. Serial No. 197,501.

My invention is a fruit box sterilizer for use particularly in sterilizing boxes in which fruits and vegetables are conveyed from the farm or garden to the packing house, such boxes being returned for refilling.

It has been found that a source of infection of fruit orchards, fruit gardens, and vegetable gardens is frequently caused by bringing the infection or infestation into healthy groves or gardens from those that have been infected by means of the boxes or other containers which are used to convey the produce to packing plants of various kinds and then taken back to the groves or gardens for refilling. It is impractical in operations on a large scale to return the individual boxes or containers from certain definite groves or gardens back to these same groves or gardens after being emptied at the packing house and hence the boxes and containers from infected groves and gardens become mixed with those from non-infected groves and gardens. Such infections are various insect pests, their larvæ and eggs, mold spores, parasites, and fungus diseases of various kinds. In some districts the State, county or municipal regulations place what may be termed a quarantine on the marketing of produce from infected groves although such produce may be suitable for human consumption and that the fruit and vegetables from such isolated or quarantined sections has to be separately handled, all of which adds to the expense as well as complicates the matter of packing fruits and vegetables.

Therefore, an object of my invention is to thoroughly sterilize the boxes or containers, preferably at the packing house after they have been emptied of their contents, and to return such boxes to the various groves and gardens properly sterilized so that it is immaterial whether the boxes from infected groves or gardens are returned to those which are not infected and hence overcoming the objection of quarantined or isolated districts. In accomplishing this sterilizing I preferably perform the operation by steam at a sufficiently high temperature and maintained for a sufficient length of time to kill the various pests, such as insects, to destroy their larvæ and eggs, and also to destroy mold spores, various parasite or fungus diseases, and in fact anything which is harmful affecting fruit groves or gardens.

It has been found that even using steam it is a difficult proposition to kill all the pests as the various boxes or containers used are generally made of wood having joints and reinforcing corners, these providing cracks and the like in which the various pests, such as insects, larvæ and eggs, mold spores and fungus diseases, may be more or less secure from the effects of the steam. Therefore, another object of my invention is to inject the steam into the boxes and containers in such a manner that it will be positively forced into all the angles, cracks and crevices of such boxes or containers and as another feature of my invention I inject the steam into the inverted boxes or containers so that due to the natural tendency of the steam to rise it will to a certain extent work its way through the cracks of the boxes or containers.

Another object of my invention is to increase or prolong the life of the boxes or containers which are subjected to considerable rough usage and this is accomplished by the action of the steam which toughens the wood and increases its elasticity, therefore, materially reducing the brittleness of the wood, especially in dry weather, so that it is less liable to crack and break. The joints and cracks are also tightened by the swelling of the wood fibre. The securing devices, such as screws, staples or nails, are also held fast in the wood due to this swelling of the fibre and also the rusting of such fasteners is increased and thus the various elements of the box or container are held more securely together than without any steam sterilization.

To accomplish the above objects I preferably employ an elongated chamber through which a conveyor in the form of an endless chain or belt device travels, preferably the upper run of this conveyor passing through the chamber from one end to the other, the lower run being below the chamber. The boxes or containers are fed to the chamber in any suitable manner and preferably up side down and pass through double doors or gates forming a spaced antichamber so that one door is closed before the other opens, thereby limiting the escape of the steam. The boxes are drawn through the chamber from one end to the other and through such double doors and antichambers by the conveyor and in such travel are subjected to the direct impingement of jets of steam, these jets being injected at different angles and directions relative to the container so that it attacks all the joints and crevices of such boxes or containers. At the discharge end there is another set of double doors with an outlet compartment or chamber, one door only opening at a time to restrict the escape of steam, and at the discharge end of the boxes are dumped, coming right side up.

The chamber is preferably on a slight slope so that the condensed steam discharges towards one end and the top or lid is preferably constructed in sections so that these may be opened or removed to allow repairs or the like. In order to obtain the correct temperature the steam is preferably controlled by a thermostatic mechanism and in addition there are a plurality of sets of pipes which may be manually operated so that a greater amount of steam may be injected at the incoming end where the boxes are cold and a lesser amount at the out-going end where the boxes are hot. The time of treatment is regulated by the length of the sterilization chamber and the rate or speed of movement of the boxes therethrough.

My invention is illustrated in the accompanying drawings, in which:

Figure 1 is a plan view of my sterilizer showing part of the equipment for feeding boxes or containers thereto and for discharge of same.

Figure 2 is a side elevation, partly broken away, showing the sterilizer and the associated equipment.

Figure 3 is a plan of part of the sterilizer, a section being broken open.

Figure 4 is a longitudinal vertical section on the line 4—4 of Fig. 3 in the direction of the arrows.

Figure 5 is a transverse vertical section through the sterilizer on the line 5—5 of Fig. 4 in the direction of the arrows.

Figure 6 is a diagrammatic perspective view of the steam piping for my sterilizer.

Figure 7 is a detail perspective view of one of the steam pipes, showing the various types and positions of nozzles.

Figure 8 is a cross section on the line 8—8 of Fig. 7, showing a nozzle type of outlet.

Figure 9 is a section on the line 9—9 of Fig. 7, showing an orifice type of jet.

Figure 10 is a cross section of a modified construction showing two lines of conveyors with containers passing thereon through the sterilizing chamber.

Figure 11 is a perspective view of a type of lug box commonly used in the fruit industry to illustrate the action of my sterilizer.

Referring to the general assembly, shown in Figs. 1 and 2, part of the packing plant is indicated generally by the numeral 11 having the basement floor 12, a ground floor 13, a first floor 14, and a roof structure 15. The fruit is generally brought into the plant or handled on the ground floor level and the empty boxes are placed on a feeding conveyor 16, which is illustrated as of a belt type, having an upper pulley 17 over which the belt operates. The sterilizer, designated generally by the numeral 18, is preferably an elongated structure, rectangular in cross section, and of considerable length. This is open at the in-feeding end 19 and also at the out-feeding end 20. A conveyor 21 is preferably of the chain type and operates over sprocket wheels 22 at the in-feeding end and 23 at the out-feeding end, either one or both of such sprockets being adjustable longitudinally to take up the slack. The conveyor chain 24 has a series of engaging lugs 25 thereon. The upper run of this chain travels longitudinally of the sterilizing chamber and carries the boxes or containers as hereunder mentioned.

At each end of the chamber there are double door constructions 26. Each of these doors is pivoted at the top, as indicated at 27, and fits in a contracted space 28, as illustrated in Fig. 1, at the discharge end. This space is very little wider than the box and each of the doors has a rubber or canvas packing on the edge forming a more or less tight fit against the sides of the chamber. These doors are spaced apart forming antichambers 29 and 30 at the entrance and discharge ends of the sterilizer. Such chambers are of sufficient length so that when a box is entered, forcing one of the doors open, this door first opened closes before the second door is opened, thereby preventing general escape of steam as the boxes pass in and out of the sterilizer. The sterilizer is preferably mounted on a slight slope and the pulley 17 is placed sufficiently close to the sprocket 22 so that the boxes will be gripped by the lugs 25 and conveyed into the sterilizer.

At the out-feeding end of the sterilizer there are a pair of tracks 31 which are downwardly curved at their outer end 32. These tracks are spaced apart so that they fit inside of a box which is carried in the inverted position, as shown in Fig. 2, and when the end of the box drops over the curved section 32 it engages the upstanding end 33 of a down chute 34 which conveys the boxes to the ground floor 13.

The detail construction of my sterilizer is substantially as follows, having reference particularly to Figs. 3, 4 and 5.

A series of frames 35 are positioned longitudinally of the building, being supported on the floor 14, the frames being graduated in height to give the proper slope, and inside the frame there is a trough construction having sides 36 and a bottom 37, preferably formed of boards. At spaced distances on the inside of this trough construction there are angular blocks 38 and extending lengthwise of the trough structure are layers of felt or other insulating material 39, these layers being on the sides and bottom. A metal trough 40 is secured in position inside the wooden trough and inside of the insulating lining, this having lower corners 41 which rest on the angular blocks 38. The floor 42 rests on the lower insulating material and the side walls are secured in position by bolts 43 which pass through wooden strips 44 inside of the metal which is embedded in the insulation material and engage blocks or strips 45 on the inside of the walls, thus distributing the tension of the bolts over a considerable area of the metal walls of the trough. Capping pieces 46 extend longitudinally of the walls 36 and a metal rim 47 is bent thereover and preferably turned down on the outside, as indicated at 48.

Longitudinal sills 49 extend lengthwise of the floor 42 and on these sills there are a series of ties or sleepers 50. Extending longitudinally of these sleepers or ties there are angle rails 51 preferably having the open sided angle inwardly, as illustrated in Fig. 5. A channel 52 extends longitudinally of the sterilizer, being supported on the ties 50 and preferably has a metal wearing strip 53 in the base. The upper run of the chain 24 slides in this channel, the lugs 25 extending upwardly and engaging the rim of a box when inverted.

In order to afford a steam tight cover which may be opened, I form a cover or lid, designated generally by the numeral 54. This is made up of two or more plies of wood 55 with an insulating packing of felt or the like 56 on the inside, with a metal sheet 57 covering the insulation, this strip being preferably turned up as indicated at 58 on the wood construction. The top is divided into sections, each section having a sufficient number of hinges 59, and clamps 60 on the opposite side, these clamps being of a type used in refrigerators, and clamp the top or cover down tightly on resilient packing strips 61. At each joint of the top there are cross beams 62 which extend from side to side of the trough shaped structure and form a steam tight joint with the transverse packing strips 63. I also use packing strips 64 secured at each end of the hinged lid sections which aid in forming a steam tight joint at the transverse joints.

The heating arrangements are provided by a boiler or the like 65 which, by means of a steam pipe 66, convey the steam to a thermostatic valve designated generally by the numeral 67. From this valve there is a connection 68 to two in-feeding pipes 69 and 70, each having valves. As shown in Fig. 6 there are four pipes 71 which lead from the center in-feed of the steam towards both ends of the sterilizing chamber, these pipes being closed at the end. These pipes 71 are fitted in the angle of the rails 51 and are provided either with nozzles 72 or with orifices 73. The nozzles are illustrated as being curved, as at 74, and are preferably short nipples, being positioned to discharge towards each other and discharge the steam upwardly into the inverted boxes so that the steam will forcibly strike all the cracks and joints. These nozzles or nipples, such as illustrated in Fig. 8, are preferably located at the in-feeding end of the conveyor and the orifices 73, as shown in Fig. 9, which are in different positions angularly on the pipes towards the out-feeding end. I also install thermometers 75 on the outside of the sterilizing chamber on the in-feeding and out-feeding parts so that the temperature may be kept at that desired. It is understood that the thermostatic valve 67 is controlled by a thermostat in the chamber and governs the flow of steam in accordance with the requirements in sterilizing the boxes and that the valves in the pipes 69 and 70 may be independently manipulated so as to adjust or regulate the amount of flow of steam going towards opposite ends of the sterilizer and to opposite sides thereof. It is manifest that as the boxes enter in a cold or cool condition that more steam is required at the in-feeding end than at th out-feeding end to maintain a constant temperature throughout the chamber and also that in chilly weather more steam is required than in hot weather.

In Fig. 11 I illustrate a form of field or lug box, designated generally by the numeral 76, such as commonly used in the citrus industry. These boxes have side walls 77 and end walls 78, the end walls being heavier than the side walls, and a base 79 nailed to said walls, usually being of thicker boards than the side boards. Triangular vertical reinforcing corner strips 80 form a brace in the corners and there are usually end straps 81 which are nailed to the top of the end boards and to the end of the side boards. The reinforcing strips 80 form joints and cracks in which it has been found difficult to kill the various insects and other pests which infest orchards, as well as these pests getting in the cracks of the bottom boards and in the joints underneath the straps 81. With my sterilizer the sterilizing of such boxes and those having a great number of angles, joints and cracks, is readily obtained.

In the construction shown in Fig. 10 the sterilizing chamber is shown as having two sets of track-ways 82 and 83 with a separating rail 84 therebetween and two lines of boxes may travel down these track-ways. By this construction the capacity of a sterilizing plant for a certain length may be doubled or, if desired, the device may be shortened and the speed of passing the boxes through may be slowed down.

I have found a convenient manner to operate the moving mechanism of my sterilizer is by installing an electric motor 85 suspended from the roof 15, to have a speed reduction device for the belts and pulleys 86, and to drive a shaft 87 on which is mounted the sprocket 23. The conveyor 21, which draws the boxes through the sterilizer, then actuates the sprocket 22 on a shaft 88 and a sprocket or belt drive 89 actuates the pulley 17, thereby moving the in-feeding conveyor 16 in synchronism with the conveyor 21.

The manner of operating my sterilizing plant and its method of functioning is substantially as follows:

As above mentioned, the fruit or vegetables are usually emptied from the field or lug boxes or other containers on the ground floor level 13 and these boxes or containers are placed up side down on the in-feeding conveyor 16, and by such conveyor are carried upwardly to the sterilizing machine. The boxes are generally run lengthwise and the lugs 25 on the chain 24 of the conveyor 21 engage the box either inside the leading end or outside the trailing end. The entrance end 19 is slightly converging, centering the boxes relative to the doors 26. The box shoves the door upwardly, the door having a close fit against the sides of the trough like chamber, and allowing the box to enter the antichamber 29. The outer door then drops by gravity before the inner door starts to open and, therefore, forms a block preventing the undue escape of steam, substantially the only steam escaping being part of that contained in the antichamber. The continued movement of the box opens the inner door and the box starts on its travel through the sterilizing chamber proper. As above mentioned, the rate of movement is timed so that the box will be held a certain specified period of time in the sterilizing chamber and subjected to steam at a certain ascertained temperature, these factors being obtained more or less empirically to find out the necessary sterilization to secure a total extermination of the pests or a certain percentage of kill.

As above mentioned, I preferably use the nozzle type of jets 74, as shown in Figs. 7 and 8, adjacent the inlet end of the sterilizing chamber and these nozzles are placed at different angles relative to the axis of the steam pipes and to each other and blow the steam into the corners and crevices of the inverted boxes. The orifice type of jets 73, such as shown in Figs. 7 and 9, are preferably used adjacent the center part and outlet end and function to a certain extent to cover the whole surface of the box inside with jets of steam. The whole chamber becomes filled with steam so the boxes both inside and out are not only subjected to the direct impinging steam but the continued high temperature. The thermostatic control of the main steam pipe regulates the amount of steam required to maintain the temperature constant and by means of the valves in the pipes 69 and 70, leading steam to the jet pipes 71 which lead towards the in-let and the out-feeding end of the sterilizer, enable independent regulation to be had of such ends and of the steam on both sides of the trough like chamber. The outward movement of the boxes is somewhat similar to the in-feeding action, the boxes being guided into the contracted space 28 before reaching the first door which is raised by the box, and dropped before the second or outer door is opened, the box being in the antichamber 30 a short period with both doors closed. There is likewise a certain escape of steam when the box passes out but this is not excessive. The leading end of the box is carried on the tracks 31 until such end drops at the outer curved end 32. This allows the boxes to tilt downwardly and on striking the upstanding end 33 of the down chute 34 the boxes are turned right side up and are ready to be packed on trucks and taken back to the groves or gardens.

From the above description it will be seen that I have developed an apparatus and a method for sterilizing field boxes or containers in which these are conveyed in a continuous movement through a chamber having a body of steam at designated temperatures, that the steam is injected into the boxes or containers when these are inverted so that the natural tendency of the steam to pass upwardly causes it to work its way through the various cracks and crevices in the corners and bottom of the boxes, therefore, effectively coming in contact with the various insect and fungus pests. The steam which is condensed into water runs out of the lowest end of the sterilizing chamber, this preferably being the discharge end. It is to be noted by my construction of sterilizing chamber that the top may be readily folded back or opened to allow access to substantially any part of the chamber for cleaning purposes or to correct any derangement of the machinery.

It will be noted in my construction, that the sterilizing chamber has a slight downward slope, the boxes traveling at a slight inclination down the tracks. This allows for the outflow of the condensed steam along the bottom of the sterilizing chamber and out of the discharge end, and also as the steam tends to rise to the upper end of the sterilizing chamber, this upflow of the steam is met by the downwardly and inwardly moving boxes, thus efficiently enveloping the boxes, both interiorly and exteriorly in the hot steam vapors.

Another feature of my invention is the construction for turning the boxes right side up at the discharge end. This is a useful feature in connection with the box sterilizer, as it immediately allows the steam to freely escape from the open top of the box and thus hastens the cooling and drying of the boxes. Otherwise, if the boxes were discharged inverted, the steam would be apt to condense therein, causing the boxes to wet slowly and maintain them wet.

In many citrus packing houses, it is necessary on account of lack of space and equipment of a large number of boxes to remove the boxes shortly after the sterilizing operation.

Various changes may be made in the principles of my invention without departing from the spirit thereof, as set forth in the description, drawings and claims.

I claim:

1. A box sterilizer comprising in combination a structure forming an elongated sterilizing chamber with anti-chambers at each end, each anti-chamber having inlet and outlet doors suspended from adjacent the roof of the structure, tracks running longitudinally of the chamber and anti-chambers, an endless conveyor having its upper run between the tracks thru the chambers, having means to engage boxes upside down and move such boxes in a continuous movement on the said rails, the boxes opening each of the doors in their movement, steam pipes extending longitudinally of the sterilizing chamber parallel to the tracks and having discharge orifices, supply pipes connected to the steam pipes, with means to control the steam pipes extending towards the entrance end of the sterilizing chamber separate from those extending towards the discharge end whereby the temperature of the respective ends of the chamber may be varied.

2. A box sterilizer comprising in combination a structure forming an elongated sterilizing chamber, substantially rectangular in cross section and having a roof formed of a series of hinged sections which may be opened individually for inspection of a chamber, anti-chambers at each end of the sterilizing chambers, each having inlet and outlet doors, a pair of tracks through the chamber and anti-chambers to support boxes upside down, a continuously moving endless conveyor having its upper run passing through the chambers between the tracks and having means to engage boxes upside down and slide same on the tracks, the boxes in their movement opening the doors, steam pipes extending between and longitudinally of the sterilizing chamber between the tracks and having orifices to jet steam upwardly into the boxes, and means to supply said pipes with steam, the said boxes sliding on their edge on the upper edge of the track.

3. A box sterilizer, comprising in combination a structure forming an elongated slightly downwardly inclined sterilizing chamber with anti-chambers at each end and closure means for the anti-chambers opened by boxes passing therethrough a single endless conveyor having its upper run passing through the chamber from the higher to the lower end and having its lower run passing outside of the chamber, a pair of tracks extending longitudinally of the chamber adjacent the bottom, side guides to engage the sides of the boxes in the chamber, steam pipes positioned between and longitudinally of the tracks and having orifices to discharge steam upwardly inside the inverted boxes, the said boxes sliding on their edge on the upper edge of the tracks.

4. In a box sterilizer, an elongated sterilizing chamber of substantially rectangular cross section with a metal box structure having side walls and a base extending from end to end and heat insulating material on the outside of the box structure, sills extending longitudinally inside of the box structure and on the base, tracks supported above the sills, a series of cover elements with a packing between the cover element and the upper part of the box structure to prevent escape of steam, means to move inverted boxes through the chamber on the tracks, and means to inject steam upwardly into the inverted boxes.

5. A box sterilizer, comprising in combination an elongated downwardly inclined chamber having tracks extending therethrough, means to move a series of inverted boxes continuously through the chamber, means to inject steam upwardly into the boxes while in the chamber, said steam as it condenses adapted to drain out of the discharge end of the chamber, tracks at the discharge end of the chamber to receive and to turn the boxes right side up, thereby allowing the steam to freely escape from the open end of the boxes to hasten the cooling and drying of said boxes.

In testimony whereof I have signed my name to this specification.

EDWARD M. WHEELER.